US010268372B2

(12) United States Patent
Myrah et al.

(10) Patent No.: US 10,268,372 B2
(45) Date of Patent: *Apr. 23, 2019

(54) STORAGE ENCLOSURE BRIDGE DETECTION

(71) Applicant: HEWLETT PACKARD ENTERPRISE DEVELOPMENT LP, Houston, TX (US)

(72) Inventors: Michael G. Myrah, Cypress, TX (US); Xiaochun Gan, Cypress, TX (US); Balaji Natrajan, Spring, TX (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 382 days.

This patent is subject to a terminal disclaimer.

(21) Appl. No.: 14/813,068

(22) Filed: Jul. 29, 2015

(65) Prior Publication Data

US 2015/0331825 A1    Nov. 19, 2015

Related U.S. Application Data

(63) Continuation of application No. 14/125,488, filed as application No. PCT/US2011/042371 on Jun. 29, 2011, now Pat. No. 9,128,631.

(51) Int. Cl.
    *G06F 13/36*    (2006.01)
    *G06F 3/06*     (2006.01)
    *G06F 13/40*    (2006.01)

(52) U.S. Cl.
    CPC .............. *G06F 3/06* (2013.01); *G06F 3/067* (2013.01); *G06F 3/0619* (2013.01);
    (Continued)

(58) Field of Classification Search
    CPC .................... G06F 17/30221; G06F 3/0689
    See application file for complete search history.

(56) References Cited

U.S. PATENT DOCUMENTS

| 5,084,870 A * | 1/1992 | Hutchison | ........... H04L 41/12 370/258 |
| 6,434,127 B1 * | 8/2002 | Ha | ................. H04Q 3/0025 370/328 |

(Continued)

OTHER PUBLICATIONS

Hewlett-Packard Development Company, L.P., "Redundancy in enterprise storage networks using dual-domain SAS configurations," TC080501TB, May 2008, pp. 1-15, Available at http://h20000.www2.hp.com/bc/docs/support/SupportManual/c01451157/c01451157.pdf, (last accessed on Jun. 29, 2011).

(Continued)

*Primary Examiner* — Hyun Nam
(74) *Attorney, Agent, or Firm* — International IP Law Group, PLLC

(57) ABSTRACT

A method for detecting an improper storage system configuration is provided. The method includes receiving, within a first switch, an indication of a configuration change of a storage system. The method also includes performing device discovery to identify devices operatively coupled to the first switch. The method also includes receiving a storage device identifier of a storage device operatively coupled to the first switch. The method also includes searching a repository for the storage device identifier to determine whether the storage device is managed by a second switch.

20 Claims, 4 Drawing Sheets

(52) U.S. Cl.
CPC ............ *G06F 3/0635* (2013.01); *G06F 13/40* (2013.01); *G06F 13/4022* (2013.01)

(56) References Cited

U.S. PATENT DOCUMENTS

| | | |
|---|---|---|
| 7,478,177 B2 | 1/2009 | Cherian et al. |
| 7,694,029 B2 | 4/2010 | Kubo et al. |
| 7,721,021 B2 | 5/2010 | Johnson |
| 7,730,252 B2 | 6/2010 | Odenwald et al. |
| 2004/0015566 A1* | 1/2004 | Anderson ......... G06F 17/30221 709/219 |
| 2005/0065977 A1* | 3/2005 | Benson ............. G06F 17/30575 |
| 2005/0147218 A1* | 7/2005 | Novack .................. H04L 12/66 379/88.18 |
| 2006/0130137 A1 | 6/2006 | Wewel et al. |
| 2008/0034122 A1 | 2/2008 | Kubo et al. |
| 2009/0083423 A1 | 3/2009 | Basham et al. |
| 2009/0172206 A1 | 7/2009 | Hall, IV et al. |
| 2009/0193158 A1* | 7/2009 | Takeda ................ G06F 11/0727 710/16 |
| 2010/0036948 A1 | 2/2010 | Cassiday et al. |
| 2016/0217720 A1* | 7/2016 | Chaji ..................... G09G 3/006 |
| 2017/0153946 A1* | 6/2017 | Baptist ................ G06F 11/1076 |

OTHER PUBLICATIONS

Hewlett-Packard Development Company, L.P., "Serial Attached SCSI storage technology," 2nd Edition, TC090603TB, Jun. 2009, pp. 1-18, Available at http://www.scribd.com/doc/47013309/SAS-Technology, (last accessed on Jun. 29, 2011).
ISR/WO, PCT/US2011/042371, dated Feb. 29, 2012, 8 pps.

\* cited by examiner

100

300

STORAGE ENCLOSURE BRIDGE DETECTION

The present application is a continuation application claiming priority from co-pending U.S. patent application Ser. No. 14/125,488 filed on Dec. 11, 2013 and entitled STORAGE ENCLOSURE BRIDGE DETECTION, the full disclosure of which is hereby incorporated by reference.

BACKGROUND

Direct-attached storage (DAS) refers to a data storage system that is directly attached to a server or workstation. The data capacity and connectivity of the DAS system may be improved through the use of switches or expanders, which enable a large bank of DAS devices to be coupled to multiple servers. The storage resources of the DAS devices are made accessible to servers by configuring zone groups, which control how the expanders route connections through the switch to couple specific servers to specific storage drives. Often, components of the DAS system are implemented as blade devices deployed in a blade enclosure. For example, a single blade enclosure may include several blade servers, storage controllers, and switches, among other components. The blade enclosure can provide a variety of services such as power, cooling, networking, various interconnects, and system management. The DAS system may use the Serial Attached Small Computer System Interface (SAS) protocol for physically connecting and transferring data between the servers and the storage devices. Non-blade server solutions are also possible.

A SAS switch storage network can be configured to provide two or more independent SAS fabrics. In such a configuration, one set of initiators may be coupled through a first SAS fabric to a first storage enclosure and another set of initiators may be coupled through a second SAS fabric to a second storage enclosure. Connections between the initiators and the corresponding SAS fabrics may be made through cabling or, in the case of a blade server, the internal interconnects provided by the blade server. In a customer data-center environment, it is often the case that multiple SAS switches controlling different SAS fabrics are operating within the same geographical area, for example, within the same rack.

BRIEF DESCRIPTION OF THE DRAWINGS

Certain exemplary implementations are described in the following detailed description and in reference to the drawings, in which.

DETAILED DESCRIPTION OF SPECIFIC EMBODIMENTS

Examples of the present techniques provide a system and a method for detecting an improper bridge between two independent SAS fabrics through improper cabling. In SAS configuration with two or more independent SAS fabrics, each SAS fabric may include a separate set of switches for coupling the SAS fabric's initiators to the storage drive enclosure assigned to that SAS fabric. Occasionally, two switches from independent SAS fabrics will be cabled to the same storage enclosure by accident. When two independent SAS fabrics are cabled to the same storage enclosure, an illegal configuration may be created where the last switch connected to the storage enclosure will be able to access the storage enclosure. This may result in multiple initiators having access to the same set of storage drives, which can potentially cause data loss.

Examples of the present techniques provide a DAS system that can detect an improper bridge between independent SAS fabrics caused by improper cabling to a storage enclosure. Upon bridge detection, the improperly coupled switch port may be disabled to prevent the corresponding storage enclosure from being accessed by multiple initiators. Further, a notification may be provided to the user to alert the user about the improper configuration. In this way, the user is able to quickly identify and solve the configuration problem and complete the DAS system setup. Various embodiments are described below by referring to several examples.

Figure 1:
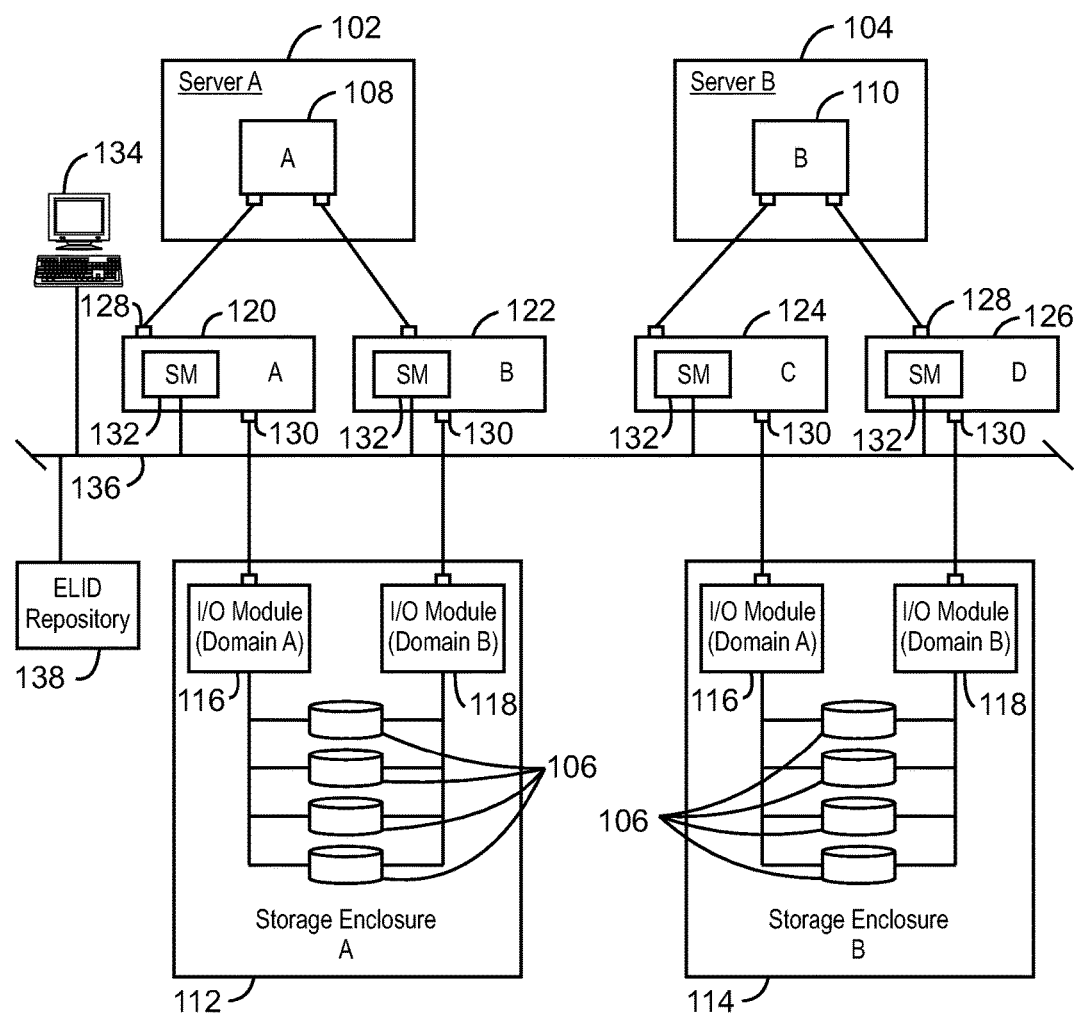
FIG. 1 is a block diagram of a direct attached storage system in accordance with example implementations.

FIG. 1 is a block diagram of a direct attached storage (DAS) system 100 in accordance with example implementations. The DAS system 100 may include one or more servers, referred to herein as server A 102 and server B 104. Each server 102 and 104 may include one or more storage controllers for enabling communications with one or more storage drives 106. For purposes of clarity, each server is shown as having a single storage controller, referred to herein as storage controller A 108 and storage controller B 110. However, it will be appreciated that each server 102 and 104 may include two or more storage controllers. In an example, the storage controllers 108 and 110 and the storage drives 106 use the Serial Attached Small Computer System Interface (SAS) protocol for connecting and transferring data. Each storage controller 108 and 110 may be referred to as an initiator, and each storage drive 106 may be referred to as a target.

The storage drives 106 may be included in one or more storage enclosures. For example, the DAS system 100 of FIG. 1 includes two storage enclosures referred to herein as storage enclosure A 112 and storage enclosure B 114. Each storage enclosure 112 and 114 may be a dual domain storage enclosure, meaning that two independent paths are provided for accessing the storage drives 106. Accordingly, each storage enclosure 112 and 114 includes a first I/O module referred to as the domain A I/O module 116 and a second I/O module referred to herein as the domain B I/O module 118. Within each storage enclosure 112 and 114, the domain A I/O module 116 and domain B I/O modules 118 control access to the same set of storage drives 106. Each I/O module 116 and 118 may include an expander for controlling access to the storage drives 106.

The storage controllers 108 and 110 may be coupled to the storage drive enclosures 112 and 114 through one or more switches, such as SAS switches, referred to herein as switch A 120, switch B 122, switch C 124, and switch D 126. In examples, the switches 120-126 and the servers 102 and 104 are included within a blade enclosure that provides internal interconnections for operatively coupling the switches 120-126 and the servers 102 and 104. In a non-blade system, such as a rack mount system, cables may be used to connect the rack mount server's storage controllers 108 and 110 to the rack mount SAS switches 120-126. Each switch 120-126 may include ports 128 for coupling the switch to the storage controllers 108 and 110. Each switch 120-126 may also include ports 130 for coupling the switch 120-126 to the storage drive enclosures 112 and 114. In a blade server system, the ports 128 may be interconnect bay ports and the ports 130 may be external ports.

Each switch 120-126 may include an expander that controls the routing between the ports 128 and 130, and a storage manager 132 for configuring the switch's expander. Commands may be sent from the storage manager 132 to configure the expander such that a particular storage controller 108 or 110 will be operatively coupled to one or more storage drives 106 specified by the user. As shown in FIG. 1, switch A 120 and switch B 122 are used to provide dual domain connectivity to storage enclosure A 112, and switch C 124 and switch D 126 are used to provide dual domain connectivity to storage enclosure B 114. A group of switches that are used to provide dual domain connectivity to a common storage enclosure may be referred to herein as a switch set. For example, switch A 120 and switch B 122 form one switch set, and switch C 124 and switch D 126 form another switch set. All of the switches within a single switch set may be controlled by a single storage manager 132. Thus, if more than one switch in a switch set includes a storage manager 132, one of the storage managers 132 may be active, while all other storage managers 132 in the switch set may be passive.

Each storage manager 132 may be operatively coupled to a storage administration device 134 through a network 136 such as a TCP/IP network, for example. The storage administration device 134 may be, for example, a general purpose computer that enables an administrator to configure the switches 120-126 remotely. The storage administration device 134 may also receive information from the switches 120-126 regarding the switch configuration. The storage administration device 134 may include a display for displaying information received from the switches 120-126. The network 136 may also be used to enable the storage managers 132 to communicate with each other, for example, to establish active and passive management roles.

The storage controllers 108 and 110 can be configured as part of independent SAS fabrics. Each independent SAS fabric may be referred to as a Zoned Portion of a SAS Delivery Subsystem (ZPSDS). As shown in FIG. 1, storage controller A 108 of Server A 102 is coupled to switch A 120 and switch B 122. Switch A 120 is coupled to the domain A I/O module 116 of storage enclosure A 112 and switch B 122 is coupled to the domain B I/O module 118 of storage enclosure A 112. Accordingly, the storage controller A 108 of server A 102 is configured as part of a first independent SAS fabric that includes switch A 120, switch B 122, and storage enclosure A 112. Further, storage controller A 108 has two independent paths to the storage drives 106 of storage enclosure A 112.

Similarly, storage controller B 110 of Server B 104 is coupled to switch C 124 and switch D 126. Switch C 124 is coupled to the domain A I/O module 116 of storage enclosure B 114 and switch D 126 is coupled to the domain B I/O module 118 of storage enclosure B 114. Accordingly, storage controller B 110 of server B 104 is configured as part of a second independent SAS fabric that includes switch C 124, switch D 126, and storage enclosure B 114. Further, storage controller B 110 has two independent paths to the storage drives 106 of storage enclosure B 114.

Within each independent SAS fabric, the user may configure the connectivity between the storage controllers 108 and 110 and the storage drives 106 by defining zone groups using the active storage manager 132 of the switch set. A zone group is a group of one or more storage drives 106 that can be assigned to a particular storage controller 108 or 110. For example, in a blade server system, the ports of each storage controller 108 and 110 may be routed to designated interconnect bay ports 128, which are viewable from the storage administration device 134 based on configuration information received from the storage manager 132.

It will be appreciated that the DAS system 100 shown in FIG. 1 is but one example of a DAS system, as various elements may be added or removed in accordance with a particular implementation. For example, DAS system 100 may include any suitable number of servers, and switches. Further, the DAS system 100 may include any suitable number of storage enclosures 112 and 114, with any suitable number of drive bays, and storage drives 106. Further, the DAS system 100 may be implemented in a blade system or a rack mount server system.

During the physical configuration of the DAS system 100, it may be possible for the user to improperly bridge the two independent SAS fabrics by cabling the two SAS fabrics to the same storage enclosure 112 or 114. For example, improper bridging of the independent SAS fabrics may result if the user incorrectly cables both switch A 120 and switch C 124 to the domain A I/O module 116 of storage enclosure A 112. In this scenario, two switches of independent SAS fabrics are coupled to the same storage enclosure I/O module, resulting in both SAS fabrics being bridged via the Domain A I/O module 116 such that all devices coupled to switch A 120 will be able to discover all devices coupled to switch C 124. Thus, it may be possible for both switch A 120 and switch C 124 to zone storage enclosure A 114 to two different initiators, for example, storage controller A 108 and storage controller B 110. This can cause the user confusion and potential data loss.

Another example of an improper connection between SAS fabrics occurs if Switch A 120 is cabled to the domain A I/O module 116 of storage enclosure A 112 and switch C 124 is cabled to the domain B I/O module 118 of storage enclosure A 112. In this scenario, although the two SAS fabrics will not be fully bridged, switch A 120 and switch C 124 will be able to access the same set of storage drives of storage enclosure A 112. Thus, both switch A 120 and C 124 will be able to zone the same storage drives 106 to different storage controllers, for example, storage controller A 108 and storage controller B 110. This can result in data loss due to corrupted drive meta data, for example.

In examples, the DAS system 100 may be configured to detect improper bridging of independent SAS Fabrics by determining whether two switch sets from independent SAS fabrics have management access to the same storage enclosure. Detecting a bridge between independent SAS fabrics may be accomplished by communicating storage-enclosure identification information between each switch set in the DAS system 100. In examples, the storage enclosures 112 and 114 may be identified according to an enclosure logical ID (ELID).

An ELID is a base SAS address reported by each I/O module 116 and 118. The domain A I/O module 116 and domain B I/O module 118 of a particular storage enclosure 112 or 114 both report the same ELID so that management software can identify which two IO modules in the SAS fabric belong to the same storage enclosure. The ELIDs for each of the storage enclosures 112 and 114 in the DAS system 100 can be communicated amongst the SAS switches 120-126 on the same network 136. The SAS switches 120-126 can use this information to determine when a storage enclosure 112 or 114 is bridging SAS domains. Furthermore, although ELIDs are used to uniquely identify the storage enclosures, it will be appreciated that any other suitable type of storage enclosure identifier may be used in accordance with example implementations.

Initiators within the DAS system 100 can determine the ELID of a storage enclosure by issuing a REPORT GENERAL request to the expanders included in the I/O modules 116 and 118 of the storage enclosures 112 or 114. In addition to the REPORT GENERAL command, any command that is implemented to return the ELID could be used, including proprietary commands or the use of vendor specific fields within standard commands, like READ BUFFER. A REPORT GENERAL function is a Serial Management Protocol (SMP) function that causes the SAS device coupled to the port targeted by the request to return general information about the SAS device. In response to the REPORT GENERAL request, the targeted I/O module expander of the storage enclosure 112 or 114 may return a REPORT GENERAL response that includes the ELID of the responding expander, among other information about the SAS device. The active storage manager 132 of each switch set can issue the REPORT GENERAL request to each I/O module 116 and 118 to which it is operatively coupled. Further, the REPORT GENERAL request can be issued each time a new SAS device is added to the DAS system 100.

The storage managers 132 may store the returned ELIDs to an ELID repository 138 along with additional information about the particular switch 120-126 that manages the storage enclosure 112 or 114. For example, each entry in the ELID repository may include an ELID and a unique identifier that identifies the switch that received the ELID. The ELID repository may be, for example, a central database accessible to the storage managers 132 through the network 132. The ELID repository may use a Lightweight Directory Access Protocol (LDAP) directory structure for pushing the ELIDs and unique switch identifiers to the ELID repository. The unique switch identifier may be a SAS address of the switch, for example, a World Wide Identifier (WWID) of the switch. In this way, each switch 120-126 in the DAS system 100 can query the ELID repository 138 to determine which switch 120-126 is managing a particular storage enclosure 112 or 114.

An improper bridge between SAS fabrics can be identified if two or more switches have management access to the same storage enclosure 112 or 114. In examples, each switch 120-126 can query the ELID repository each time a new ELID is received, indicating that the switch 120-126 has been provided management access to a new storage enclosure 112 or 114. If the ELID is already represented in the ELID repository as being assigned to a different switch set of an independent SAS fabric, the switch 120-126 can alert the user of the improper configuration and disable the corresponding switch port for zoning purposes.

Figure 2:
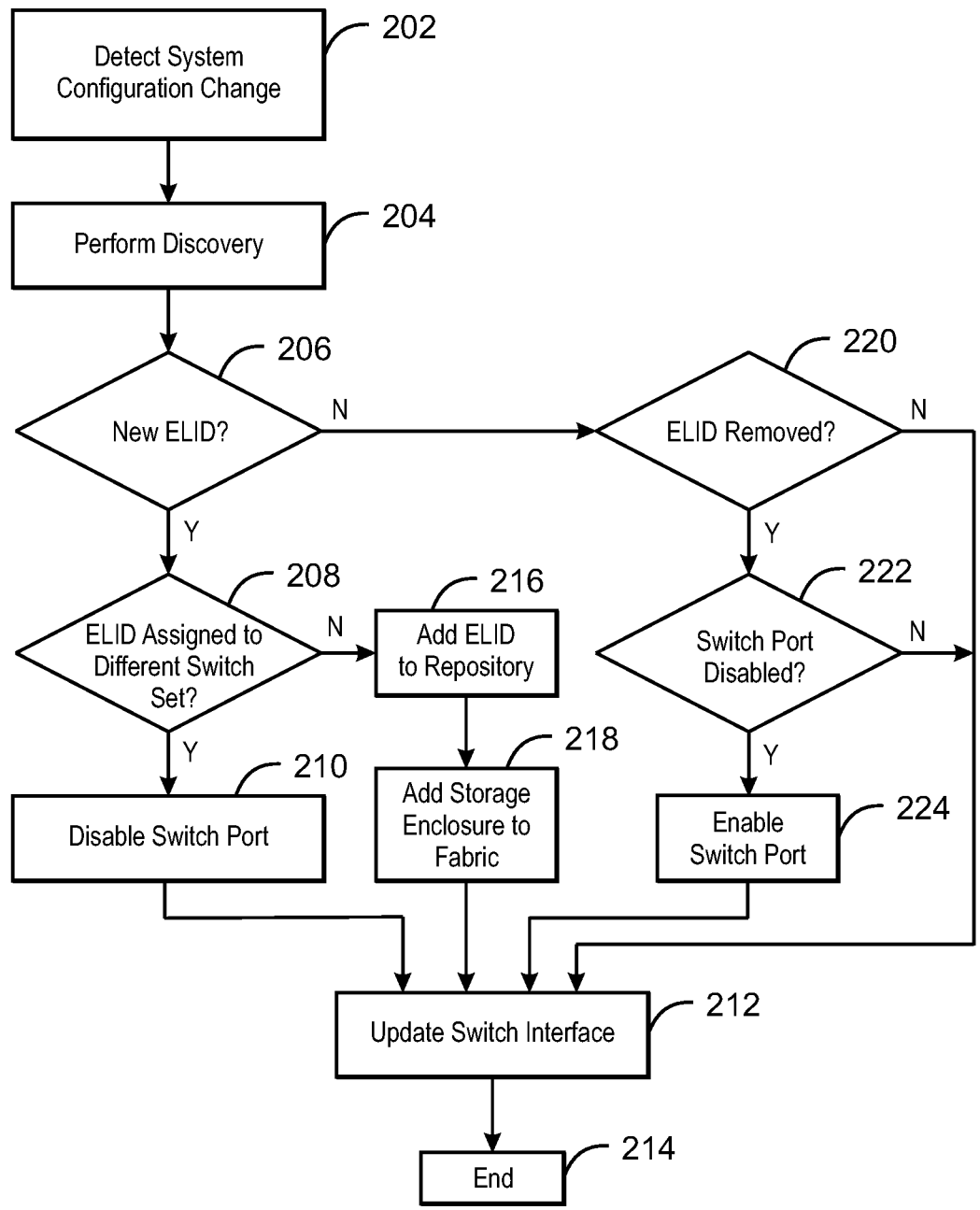
FIG. 2 is a process flow diagram of a method of detecting an improper bridge between SAS fabrics, in accordance with example implementations.

FIG. 2 is a process flow diagram of a method 200 of detecting an improper bridge between SAS fabrics, in accordance with example implementations. Referring also to FIG. 1, the method 200 may be performed by one or more of the switches 120-126 of FIG. 1. For example, the method 200 may be performed by the active storage manager 132 within each switch set. The method 200 may begin at block 202, wherein a change in the DAS system 100 configuration is detected. For example, a change in the DAS system 100 configuration may be detected by receiving a BROADCAST (CHANGE) SMP event. A BROADCAST is an event that may be transmitted to SAS initiators of the DAS system 100 in response to the occurrence of a particular type of event. A "change" broadcast may be originated by one of the switch 120-126 expanders to notify the initiators that a change has occurred in the DAS system 100. For example, if a storage enclosure is physically connected to or disconnected from one of the switches 120-126, that switch's expander may generate a BROADCAST (CHANGE) event informing the initiators of a change in the physical configuration of the DAS system 100. The BROADCAST (CHANGE) event may trigger a SAS fabric discovery process by each of the switches 120-126. For purposes of clarity, the present techniques will be described in reference to one of the switches 120-126, which will be referred to herein as the switch. It will be appreciated that each of the active storage managers 132 of each of the switches 120-126 may be configured to perform the process described herein upon receiving an indication of a change in the DAS system 100 configuration.

At block 204, the switch performs a discovery process to identify the storage enclosures to which it is coupled. Prior to performing the discovery process, the switch may save a copy of its existing SAS fabric device tree, which is a data structure that identifies each SAS device coupled to the ports of the switch. The SAS fabric device tree may be stored to a memory device included in the switch. As described further below in reference to block 210 a switch port may be disabled if bridging of independent SAS fabrics is detected, and the SAS fabric device tree may include information regarding whether a particular switch port has been disabled. For example, a particular switch port represented in the SAS fabric device tree may be flagged as disabled due to an improper port configuration discovered in a previous iteration of method 200.

The discovery process enables the switch to determine the topology of the SAS fabric managed by the switch by issuing SAS-based commands such as the DISCOVER command, DISCOVER LIST command, INQUIRY command, and REPORT GENERAL command. The DISCOVER and DISCOVER LIST commands may be used to identify the types of SAS devices coupled to the ports of the switch. The DISCOVER and DISCOVER LIST commands may be initiated by the zone manager 132. A response to the DISCOVER or DISCOVER LIST commands may be generated by the switch's expander and sent back to the storage manager 132. For example, the response to the DISCOVER or DISCOVER LIST commands may include an "ATTACHED DEVICE TYPE" field for each associated switch port. The INQUIRY and REPORT GENERAL command may be used by the storage manager 132 to acquire additional information about the device attached to a specific switch port. During the discovery process, a new SAS fabric device tree may be created in the switch expander and used for comparison with the previous SAS fabric device tree to identify changes.

At block 206, a determination is made regarding whether a new ELID has been identified in the SAS fabric managed by the switch. The determination may be made by comparing the previous SAS fabric device tree with the new SAS fabric device tree. A new ELID may be identified if the response to a REPORT GENERAL request (or other command) issued by the switch returned an ELID that was not already included in the previous SAS fabric device tree stored at block 204. If a new ELID is discovered in the SAS fabric managed by the switch, the process flow may advance to block 208. Additionally, if more than one additional ELID is identified during discovery, block 208 may be repeated for each new ELID identified.

At block 208, a determination is made regarding whether the new ELID has already been assigned to a different switch set. To determine whether the ELID has been assigned to a different switch set, the storage manager 132 may issue a query to the ELID repository 138. If the ELID is already included in the ELID repository 138 and associated with a different switch set from a different SAS fabric, then a potential storage enclosure bridging condition has been detected, and the process flow may advance to block 210.

At block 210, the switch port coupled to the storage enclosure associated with the new ELID may be disabled with regard to zoning. In other words, the storage manager 132 may not allow the user to associate the disabled switch port with a zone group. In this way, the corresponding storage enclosure will not be zoned to two different SAS fabrics even if the SAS fabrics are bridged by the improper cabling. Further, the disabled switch port may be flagged as disabled in the SAS fabric device tree of the switch. The storage enclosure corresponding to the new ELID may also be identified as being improperly configured. For example, the storage enclosure may be flagged in the new SAS fabric device tree as being improperly configured.

At block 212, a user interface or display for the switch may be updated. For example, the storage manager 132 may generate a display, viewable by the user, indicating a connection status for each of the switch ports in the DAS system 100. The user interface may also include an indication for each switch port that indicates whether the switch ports are enabled or disabled. The user interface may be configured so that any disabled switch port cannot be assigned to a zone group. Additionally, a warning message may be displayed to the user, indicating that the DAS system 100 is improperly configured. In an example, the display generated by the storage manager 132 may be any suitable type of display, including a command line interface, graphical user interface, and the like. Display information generated by the storage manager 132 may be communicated, for example, to the administration device 134 through the network 136 (FIG. 1). Additionally, the display may be generated on a liquid crystal display (LCD) or light emitting diode (LED) display provided on the switch itself.

At block 214, the process flow may terminate. At this time, the user may be aware of the improper configuration of the switch based on the display information provided by the switch interface or because the storage enclosure cannot be zoned to a storage controller. This may prompt the user to take further action to solve the improper configuration, such as by re-cabling the recently added connection to a different switch port or a different storage enclosure I/O module. The re-cabling may result in a new BRODACAST (CHANGE) event as discussed above in relation to block 202, in which case the method 200 may be started again at block 202.

If, at block 208, the ELID is not already assigned to a different switch set, the process flow may advance to block 216. At block 216, the ELID is added to the ELID repository as described above in relation to FIG. 1. For example, a new entry may be added to the ELID repository, the new entry containing the ELID and a unique identifier of the switch, such as the switch's SAS address. Adding the new entry to the ELID repository registers the identified switch as the manager of the storage enclosure identified by the ELID. The process may then advance to block 218.

At block 218, the new storage enclosure 218 may be operationally added to the SAS fabric and made available for zoning. For example, the storage enclosure may be operationally added to the ZPSDS corresponding to the switch that manages the storage enclosure. The process flow may then advance to block 212.

If at block 206, a new ELID has not been identified in the SAS fabric managed by the switch, the process flow may advance to block 220, wherein a determination is made regarding whether a storage enclosure associated with a previously identified ELID has been removed from the SAS fabric managed by the switch. If none of the known ELIDs have been removed from the SAS fabric, the process flow may advance to block 212. Otherwise, if an ELID has been removed from the SAS fabric, the process flow may advance to block 222.

At block 222, a determination is made regarding whether the switch port associated with the removed ELID is in a disabled state with regard to zoning. For example, the SAS fabric device tree may be searched to determine if the switch port has been flagged as disabled. If the switch port associated with the removed ELID is not in a disabled state, the process flow may advance to block 212. However, if the switch port associated with the removed ELID is in a disabled state, the process flow may advance to block 224, wherein the switch port may be re-enabled and identified as enabled in the SAS fabric device tree. In some cases, a bridge between independent SAS fabrics may cause two or more storage enclosures to be improperly coupled to the current switch. Accordingly, before the switch port is enabled, a check may be performed to ensure that there are no additional ELIDs coupled to the switch port that are assigned to a separate switch set of an independent SAS fabric. For example, the storage manager 132 may search the SAS fabric device tree to determine whether any other storage enclosures in the SAS fabric device tree remain flagged as improperly configured.

The process flow may then advance to block 212, wherein the switch interface is updated. It will be appreciated that if an action of the user triggers discovery by two or more switch sets, the method described above may be performed simultaneously within each of the active storage managers 132 residing in the effected switch sets. The user can quickly resolve an improper configuration by removing a cable from a port and watching for a clearing of the identification of the illegal configuration on the user interface of all of the affected SAS switches.

Figure 3:
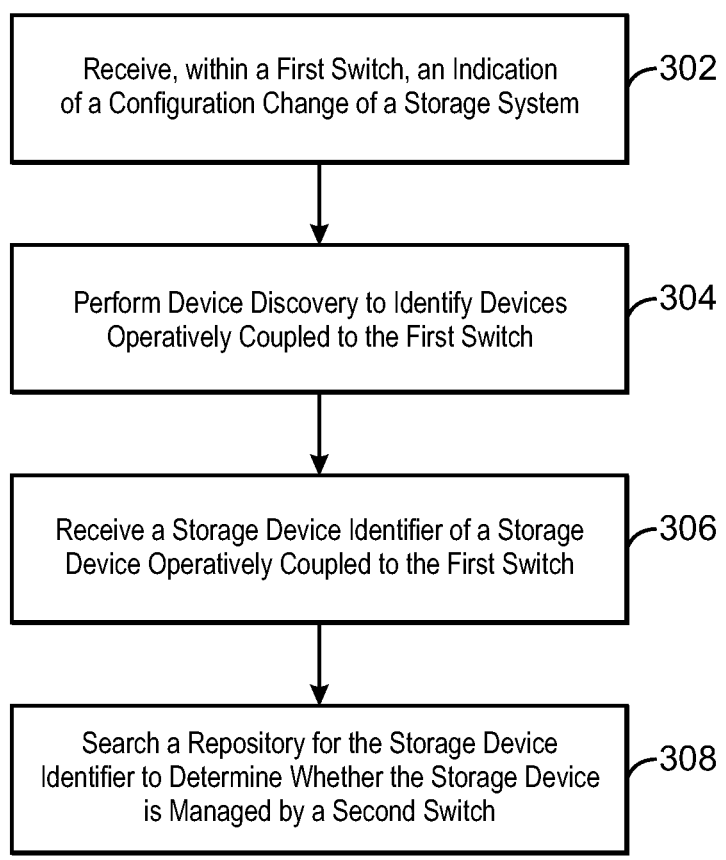
FIG. 3 is a process flow diagram summarizing a method of detecting an improper configuration of a storage system, in accordance with example implementations.

FIG. 3 is a process flow diagram summarizing a method 300 of detecting an improper configuration of a storage system, in accordance with example implementations. The method 300 may be performed by the storage manager 132. The method may begin at block 302, wherein an indication of a configuration change of the storage system is received by the first switch. For example, as discussed above, the switch expander may receive a BROADCAST (change) event in response to a device being added or removed from the storage system.

At block 304, the switch may perform a device discovery process to identify devices operatively coupled to the switch. The discovery process may be conducted by the switch expander by issuing SAS-based commands such as the DISCOVER command, DISCOVER LIST command, INQUIRY command, and REPORT GENERAL command. If the switch discovers a storage device, such as a storage enclosure, coupled to the switch, the switch may issue a REPORT GENERAL command to the storage device.

At block 306, the switch may receive a storage device identifier, such as an ELID, from the storage device operatively coupled to the first switch. The storage device identifier may be received in the REPORT GENERAL response of the storage device.

At block 308, the storage manager of the switch may search the ELID repository for the storage device identifier to determine whether the storage device is managed by a different switch. For example, if the ELID repository includes an entry for the storage device identifier, which indicates that the storage device is currently associated with a different switch identifier, then the storage device is managed by another switch and the storage configuration is improper.

If the storage manager determines that the storage device is already assigned to a different switch, then a bridge condition is identified and protective measures may be implemented. Examples of such protective measures include disabling the switch port corresponding to the storage device and alerting the user of the improper configuration through a user interface of the switch.

If the storage manager determines that the storage device is not assigned to a different switch, the configuration process can continue. For example, the storage device can be added to the ZPSDS corresponding to the switch. Adding the storage device to the ZPSDS enables the user to add the storage device to a zone group managed by the switch's storage manager. Additionally, the storage device identifier can be added to the ELID repository in association with a switch identifier corresponding to the switch, such as the switches SAS address or WWID.

Figure 4:
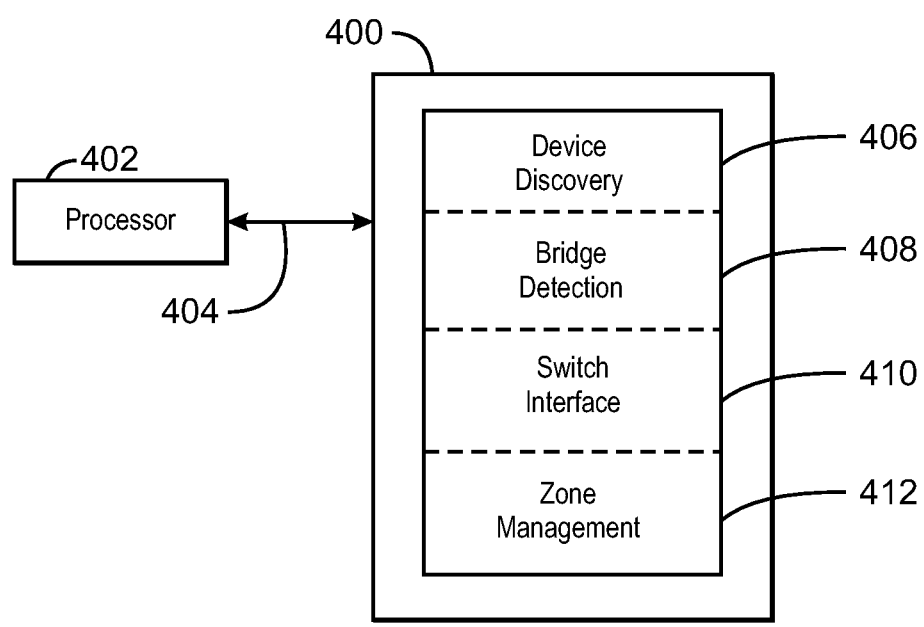
FIG. 4 is a block diagram showing a non-transitory, computer-readable medium that stores code for a storage management application, in accordance with example implementations.

FIG. 4 is a block diagram showing a non-transitory, computer-readable medium that stores code for a storage management application, in accordance with example implementations. The non-transitory, computer-readable medium is generally referred to by the reference number 400. The non-transitory, computer-readable medium 400 may correspond to any typical computer memory that stores computer-implemented instructions, such as programming code or the like. For example, the non-transitory, computer-readable medium 400 may include memory devices with non-volatile memory and volatile memory. Examples of non-volatile memory include, but are not limited to, electrically erasable programmable read only memory (EEPROM), read only memory (ROM), and flash memory. Examples of volatile memory include, but are not limited to, static random access memory (SRAM), and dynamic random access memory (DRAM). Examples of memory devices include, but are not limited to, hard disk drives, compact disc drives, digital versatile disc drives, optical drives, USB drives, and flash memory devices.

A processor 402 generally retrieves and executes the instructions stored in the non-transitory, computer-readable medium 400 to process storage management operations in accordance with example implementations. The processor 402 may be included in a switch, such as one of the switches 120-126 shown in FIG. 1. In examples, the tangible, machine-readable medium 400 can be accessed by the processor 402 over a computer bus 404.

A region 406 of the non-transitory, computer-readable medium 400 may include a device discovery module configured to receive an indication of a configuration change of the storage system and perform device discovery to identify devices operatively coupled to the switch. A region 408 of the non-transitory, computer-readable medium 400 may include a bridge detection module configured to receive a storage device identifier of a storage device operatively coupled to the switch and search the ELID repository for the storage device identifier to determine whether the storage device is managed by another switch that is part of an independent SAS fabric.

A region 406 of the non-transitory, computer-readable medium 400 may include a switch interface module configured to generate a display that indicates a status of the switch, such as whether the switch has been improperly connected to storage device of a different SAS fabric. A region 408 of the non-transitory, computer-readable medium 400 may include a Zone management module configured to create and manage zone groups in the fabric.

Although shown as contiguous blocks, the software components can be stored in any order or configuration. For example, if the non-transitory, computer-readable medium 400 is a hard drive, the software components can be stored in non-contiguous, or even overlapping, sectors.

What is claimed is:

1. A method, comprising:
   receiving, within a first switch, a storage device identifier of a storage device operatively coupled to the first switch;
   determining whether the storage device is managed by a second switch; and
   in response to determining that the storage device is managed by the second switch,
      disabling a port of the first switch, the port corresponding to the storage device; and
      updating a user interface of the first switch to indicate an improper configuration of a storage system including the storage device.

2. The method of claim 1, further comprising, in response to determining that the storage device is not managed by the second switch, storing an identifier of the storage device to a repository, in association with a switch identifier corresponding to the first switch.

3. The method of claim 1, further comprising, in response to determining that the storage device is not managed by the second switch, enabling a user to add the storage device to a zone group managed by the first switch.

4. The method of claim 1, wherein determining whether the storage device is managed by a second switch comprises searching a repository coupled via a network to the first switch and other switches, the repository identifying associations of storage devices to switches.

5. A storage manager for a first serial attached small computer system interface (SAS) switch, the storage manager comprising:
   a processor; and
   a computer readable medium on which is stored instructions that are to cause the processor to:
      receive a storage device identifier of a storage device operatively coupled to the first SAS switch;
      determine whether the storage device is managed by a second switch
      in response to a determination that the storage device is managed by the second switch of the independent device fabric,
         disable a port of the first switch, the port corresponding to the storage device; and
         update a user interface of the first switch to indicate an improper configuration of a storage system including the storage device.

6. The storage manager of claim 5, wherein, in response to a determination that the storage device is not managed by the second switch, the instructions are further to cause the processor to store an identifier of the storage device to a repository in association with a switch identifier corresponding to the first switch.

7. The storage manager of claim 5, wherein, in response to a determination that the storage device is not managed by the second switch, the instructions are further to cause the processor to enable a user to add the storage device to a zone group managed by the first switch.

8. The storage manager of claim 5, wherein, to determine, whether the storage device is managed by a second switch, the instructions are further to cause the processor to search a repository coupled via a network to the first switch and other switches, the repository identifying associations of storage devices to switches.

9. A non-transitory, computer-readable medium, comprising instructions that when executed by a processor, cause the processor to:
  receive a storage device identifier of a storage device operatively coupled to a first switch;
  determine whether the storage device is managed by a second switch; and
  in response to a determination that the storage device is managed by the second switch of the independent device fabric:
    disable a port of the first switch, the port corresponding to the storage device; and
    update a user interface of the first switch to indicate an improper configuration of a storage system including the storage device.

10. The non-transitory, computer-readable medium of claim 9, wherein, in response to a determination that the storage device is not managed by the second switch, the instructions are further to cause the processor to store an identifier of the storage device to a repository in association with a switch identifier corresponding to the first switch.

11. The non-transitory, computer-readable medium of claim 9, wherein, in response to a determination that the storage device is not managed by the second switch, the instructions are further to cause the processor to enable a user to add the storage device to a zone group managed by the first switch.

12. The non-transitory, computer-readable medium of claim 9, wherein, to determine whether the storage device is managed by a second switch, the instructions are further to cause the processor to search a repository coupled via a network to the first switch and other switches, the repository identifying associations of storage devices to switches.

13. The method of claim 1, further comprising:
  receiving, by the first switch, an indication of a configuration change of the storage system, wherein receiving the storage device identifier comprises receiving the storage device identifier based on receiving the indication of the configuration change.

14. The method of claim 1, further comprising:
  performing a device discovery process to identify devices operatively coupled to the first switch, wherein the storage device is discovered during the device discovery process.

15. The method of claim 1, further comprising:
  searching a repository for the received storage device identifier, wherein determining whether the storage device is managed by a second switch comprises determining that the storage device is managed by the second switch based on the repository including an entry for the storage device identifier.

16. The storage manager of claim 5, wherein the instructions are further to cause the processor to receive an indication of a configuration change of the storage system and to receive the storage device identifier based on receipt of the indication of the configuration change.

17. The storage manager of claim 5, wherein the instructions are further to cause the processor to perform a device discovery process to identify devices operatively coupled to the first switch, wherein the storage device is discovered during the device discovery process.

18. The storage manager of claim 5, wherein the instructions are further to cause the processor to search a repository for the received storage device identifier and to determine that the storage device is managed by the second switch based on the repository including an entry for the storage device identifier.

19. The non-transitory, computer-readable medium of claim 9, wherein the instructions are further to cause the processor to receive an indication of a configuration change of the storage system and to receive the storage device identifier based on receipt of the indication of the configuration change.

20. The non-transitory, computer-readable medium of claim 9, wherein the instructions are further to cause the processor to search a repository for the received storage device identifier and to determine that the storage device is managed by the second switch based on the repository including an entry for the storage device identifier.

* * * * *